United States Patent [19]

Ferrara

[11] 4,150,610

[45] Apr. 24, 1979

[54] INDIVIDUAL BARBEQUE APPARATUS

[76] Inventor: Neil Ferrara, 1008 Saint George Cir., Palm Springs, Calif. 92262

[21] Appl. No.: 906,522

[22] Filed: May 16, 1978

[51] Int. Cl.² ............................................. A47J 37/04
[52] U.S. Cl. .................................. 99/419; 99/421 H; 126/25 R
[58] Field of Search .................... 99/419, 421 H, 339; 126/25 R, 43; 431/145

[56] References Cited

U.S. PATENT DOCUMENTS

| 2,521,220 | 9/1950 | Huntington | 99/419 |
| 2,811,099 | 10/1957 | McGoldrick | 99/421 H |
| 3,606,609 | 9/1971 | Lipper | 126/43 |
| 3,802,330 | 4/1974 | Grazigni | 99/419 |

*Primary Examiner*—Edward J. McCarthy

*Attorney, Agent, or Firm*—Nilsson, Robbins, Dalgarn, Berliner, Carson & Wurst

[57] ABSTRACT

An individualized barbeque has a mounting plate with a groove around its periphery onto which a rotisserie-burner apparatus is removably mounted. The rotisserie-burner apparatus comprises a first and a second support between which a burner apparatus is attached. A skewer is supported between a notched member fixed to the first support above the burner apparatus and extends through an enclosed member fixed to the second support above the burner so that the skewer cannot tip under the weight of the skewer handle. The burner has a container portion for holding the fuel and outwardly bent flanges around a portion of the top edge of the burner which support a lid. The lid has a narrow elongated flame opening on a top portion and at least one vent opening in a side portion. The vent opening preferably has a vertical projection which falls outside the area defined by the bottom of the container.

9 Claims, 2 Drawing Figures

INDIVIDUAL BARBEQUE APPARATUS

BACKGROUND OF THE INVENTION

The present invention relates to individualized barbeque apparatus and, in particular, to a rotisserie-burner apparatus positioned on an individualized mounting or serving plate, the rotisserie-burner apparatus having a skewer rotatably mounted above a burner.

A desirable and attractive way for cooking and serving food may be provided by an individualized barbeque unit on which a single individual may cook his own meat or other food to his own taste. Such an individualized barbeque unit eliminates much of the time spent by the preparer in the kitchen away from guests. One such individualized barbeque apparatus is disclosed in U.S. Pat. No. 3,802,330 which provides a serving dish apparatus having a plate portion with a continuous channel around the periphery of the plate, a skewer support means between which a skewer can be placed and a burner apparatus positioned below the skewer in which a fuel, such as alcohol or sterno, may be placed and lighted to provide heat to cook the food on the skewer.

Although the above individualized barbeque apparatus provides an advantageous apparatus, it incorporates an open surface burner which is essentially a container without a lid. Thus, no control of the fuel-air mixture is provided causing the fuel to burn less efficiently. In addition, since the dish containing the fuel is opened, it is very easy for an individual using the device to jostle the plate and thus spill fuel which could ignite causing serious injury. In addition, the skewer in that apparatus is required to have a pointed region heavier than the handle to prevent the skewer from tipping out of the skewer supports. Furthermore, the skewer supports are bolted to the plate making it difficult to clean the apparatus and to remove fuel which may have been left after the cooking occurred. Finally, the skewer in the above-identified reference is generally circular in cross-section thereby allowing the meat or other food placed thereon to easily slip around the skewer as it is rotated, making it more difficult to cook the food evenly on all sides.

By contrast, the present invention provides an individualized barbeque apparatus having a rotisserie-burner assembly which may be wedged into holes provided in the mounting plate. In addition, the handle of the skewer in the present invention does not need to be lighter than the pointed portion since the present invention provides an enclosed upper member with an opening through which the pointed end of the skewer passes to hold the skewer in place. The skewer of the present invention is also preferably of a square cross-section or, at the least, has a cross-section which has at least one corner to thereby prevent the food placed on the skewer from slipping around the skewer as the skewer is rotated.

Of particular importance in the present invention, however, is the burner which is placed between the skewer supports underneath the skewer. In particular, the burner has a generally rectangular fuel container with at least one upper periphery edge of the burner having an outwardly extending flange on which the lid is supported. The lid is generally convex in shape having a top portion with an elongated flame opening out of which fuel vapors pass and a side portion with at least one vent opening into which air passes. By providing the flame opening with a vent opening, a controlled flame may be provided in which both the direction of the flame and the amount of heat generated may be controlled by varying the size of the respective flame and vent openings. Furthermore, by incorporating a top on the burner member, the possibility of injury due to the igniting of fuel which may be spilled is greatly reduced.

In U.S. Pat. No. 3,606,609, a burner for a chaffing dish is shown in which there is an upper flame opening and surrounding vent openings. However, in that burner assembly the vent openings are located above the fuel while the present invention preferably has the vent openings above a flange portion. The present invention also has an elongated burner for being positioned below and along the length of a skewer. By contrast, the above reference provides a circular arrangement whereby the vent openings may be varied by rotating one member, having a plurality of peripheral holes, relative to the second stationary member also having a plurality of peripheral holes. Misalignment of the holes causes the opening to be decreased in area, thus decreasing the amount of air let into the burner. Such an apparatus cannot be incorporated where an elongated burner apparatus, such as in the present invention, is desired to provide a flame along the entire length of the skewer.

Finally, by contrast to the burner disclosed in the above U.S. Pat. No. 3,606,609, the present invention has vent holes positioned on a side portion of the lid as opposed to a lower top portion of the lid. In addition, the vent holes in the present invention are preferably positioned over the outwardly extending flange so that the vertical projection of the holes falls outside of the area defined by the bottom of the fuel container. By so providing, the fuel vapors will have a greater tendency to rise upward through the flame opening rather than passing outward through the vent openings.

SUMMARY OF THE INVENTION

The present invention comprises an individualized barbeque apparatus having a mounting plate means on which a support apparatus is mounted. The support apparatus comprises a first support means and a second support means between which a skewer means having a handle at one end may be supported. A burner apparatus has a fluid container attached between the first and second support means below the skewer and a lid adapted for being positioned over the fuel container. The lid has a top portion with at least one flame opening therethrough and along the length thereof and a side portion having at least one vent opening therethrough.

In one embodiment of the present invention, the mounting plate may be made of wood with a continuous groove provided about its periphery. In addition, the support member through which the end of the skewer opposite the handle is placed may be an enclosed member having an opening therethrough so that the point of the skewer may be placed through the opening of the enclosed member to thereby prevent the skewer from tipping and thus falling from the support apparatus.

The present invention may also be provided with a skewer having a cross-section with at least one corner or edge region to define a ridge or corner along the length of the skewer to thereby more firmly hold the food placed thereon and prevent the food from rotating as the skewer is rotated. Finally, in the preferred embodiment of the present invention, the fuel container has an upper supporting lip on at least one side with the vent openings being positioned generally above the supporting lip so that the projection of the vent openings falls on a region outside of the area defined by the bottom of the fuel container.

BRIEF DESCRIPTION OF THE DRAWINGS

The invention will be better understood from the detailed description taken in conjunction with the drawings wherein like reference characters refer to like parts throughout and in which.

DETAILED DESCRIPTION

Figure 1:
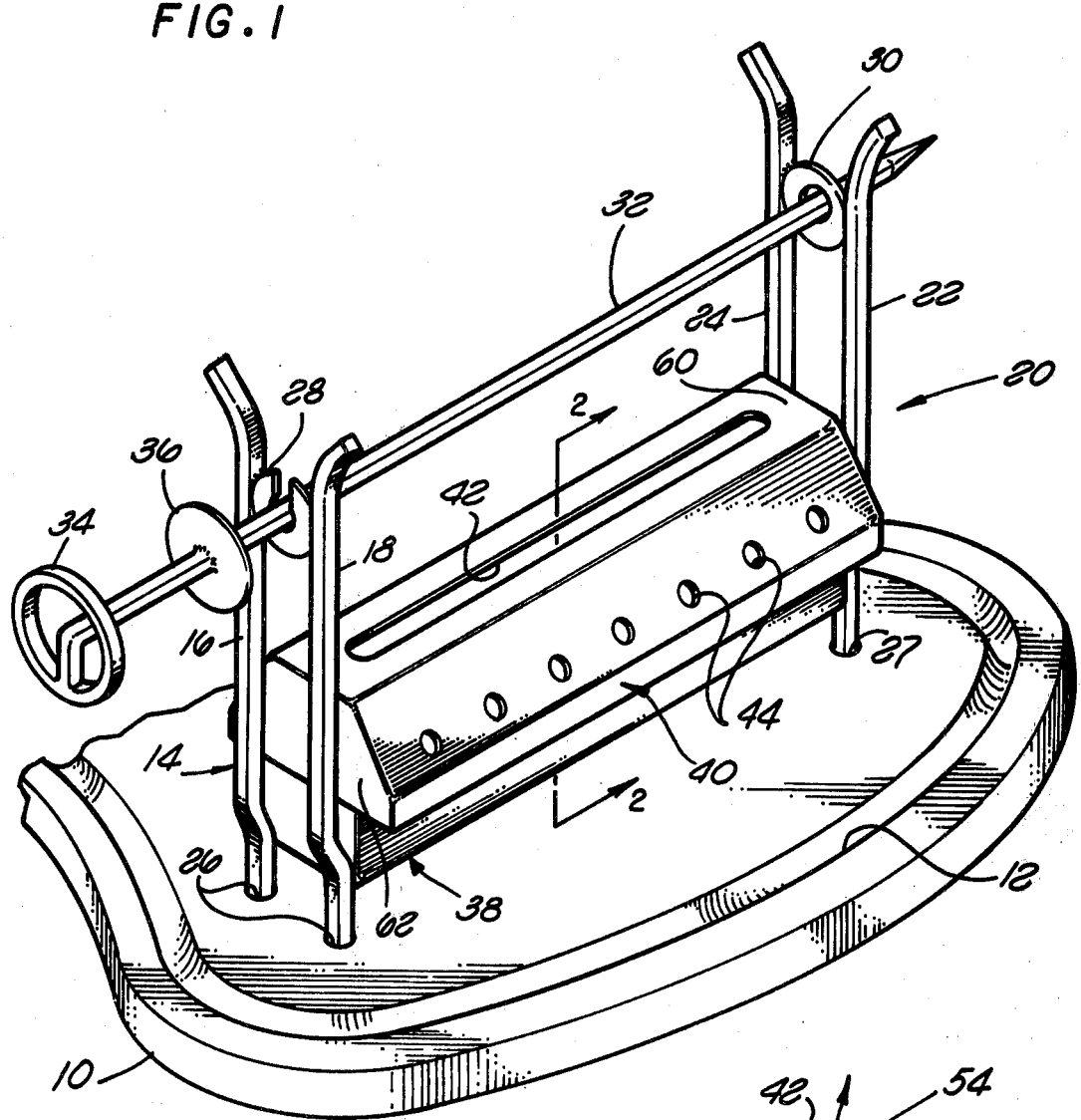
FIG. 1 is a perspective view of the present invention illustrating the arrangement of the various components.

Referring to FIG. 1, there is shown a preferred embodiment of the present invention having a mounting plate 10 which may be of a circular, oval or any other geometric shape, having a groove 12 about its periphery. The mounting plate 10 may be made of wood or any other appropriate material. A rotisserie-burner assembly is wedged into holes 26 provided in the mounting plate 10 so that the rotisserie-burner assembly may be easily removed so that the mounting plate 10 may be easily cleaned.

The rotisserie-burner apparatus generally comprises a first support means 14 having a first leg 16 and a second leg 18 wedged into appropriate sets of holes 26 and 27 in the mounting plate 10. Attached between the first leg 16 and the second leg 18 at the top of the first support means 14 is a notched member 28. A second support means 20 has a third leg 22 and a fourth leg 24 wedged into holes 27 in the mounting plate 10. Attached between the third leg 22 and the fourth leg 24 at the top of the second support means 20 and opposite the notched member 28 is an enclosed member 30 having an opening therethrough.

A skewer 32, which preferably has a non-circular cross-section with at least one edge or corner portion extending along its length may have a square cross-section with four edge or corner portions extending along the length of the skewer 32. The skewer is generally adapted to be inserted through the opening in the enclosed member 30 and placed into the notch in the notched member 28 thereby allowing the skewer 32 to be supported between the first support means 14 and the second support means 20. The skewer 32 also includes a handle 34 fixed to one of its end and further incorporates a stop plate 36 fixed adjacent to the handle to prevent the skewer handle 34 from getting too close to the flame from the burner. It will be appreciated also that the skewer 32 may be rotated while in position through the opening in the enclosed member and resting in the notch in the notched member 28 by manually turning the handle 34.

A fuel container 38 is attached between the first support means 14 and the second support means 20 below the skewer 32 when the skewer is in position. The fuel container 38 is preferably an elongated rectangular box-like structure which is capable of holding a fuel. Positioned over the fuel container 38 is a fuel container lid 40 which has a top region having a flame opening therethrough which is preferably an elongated opening extending along a substantial portion of the top. At least one and preferably several vent openings 44 are positioned generally parallel to the flame opening 42 along a side surface of the fuel container lid 40.

Figure 2:
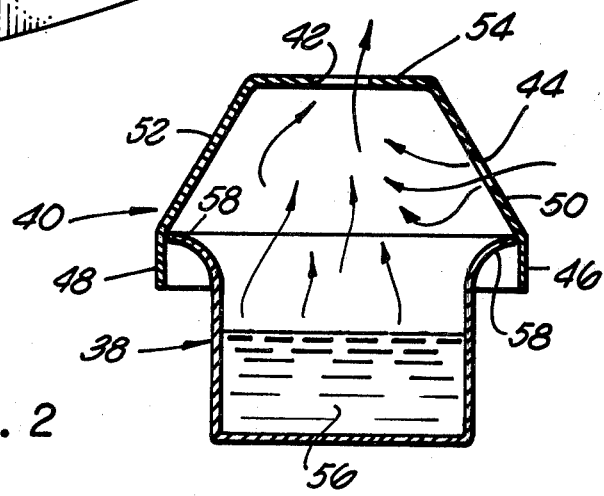
FIG. 2 is a cross-section of the burner apparatus through section 2—2 shown in FIG. 1.

Referring now to FIG. 2, an end plan view of the burner shows the fuel container 38 with a quantity of fuel 56 therein and the lid 40 in position over the fuel container 38. In the preferred embodiment, the top edge portions 58 of the fuel container 38 are bent outward to provide a support region for the lid 40.

The lid 40 comprises a continuous portion 60 enclosed at each end by an end portion 62 (see FIG. 1). The continuous portion 60 of the lid 40 preferably has a first vertical side portion 46, a first sloped side portion 50, a top side portion 54, a second sloped side portion 52 and, finally, a second vertical side portion 48. Each of the above portions is respectively adjacent and may be defined by bending a continuous sheet of metal. All of the above-described bends are made in the same direction to define a generally convex lid shape. The side openings 44 are positioned in either the first sloped side 50 or the second sloped side 52 with the flame opening being positioned in the top portion 54 of the lid 40.

In operation, the upper supporting flange or lip portion 58 of the fuel container 38 preferably extends outwardly a distance greater than the width of the vertical projection of the vent openings 44. The vent openings 44 of the lid are then positioned so that the vertical projection of the opening falls on the upper supporting lip portion rather than on an area defined by the bottom of the container 38. In so arranging the fuel container 38 and the lid 40, vapors from the fuel 56, which generally arise vertically, will pass through the flame opening 42 rather than through the vent openings 44 since the vent openings 44 will not be above the fuel 56. Thus, a flame will occur above the flame opening rather than the vent opening. Furthermore, as fuel vapors pass through the flame opening 42, air will be drawn in through the vent openings 44 to mix with the fuel vapors thereby allowing a cleaner burning flame. Soot or other unwanted fuel residues are thus prevented from being deposited on the food being cooked.

Unlike prior art individual barbeque apparatus where the burner did not have a lid, the present invention provides a lid whereby fuel is prevented from splashing onto the mounting plate. Another advantage of the present invention is that by providing a flame opening which is a narrow elongated opening extending substantially along the length of the burner, the direction of the flame can be controlled to impinge more directly against the food on the skewer, thus allowing more rapid and uniform cooking. Furthermore, by increasing or decreasing the width of the flame opening, the amount of flame and thus the amount of heat utilized to cook the food, may be varied. It will be appreciated that the speed at which the food is cooked may be varied by varying the height that the skewer is above the flame. However, in the preferred embodiment of the present invention, the skewer is approximately 1¼ inches above the top 54 of the lid 40.

Although the above invention has been particularly described, it will be appreciated that various modifications and changes can be made without departing from the spirit and scope of the present invention and that the above disclosure is intended to be illustrative of the present invention and is not to be taken in a limiting sense.

What is claimed is:

1. An individualized barbeque apparatus comprising: mounting plate means;

support apparatus mounted to the mounting plate means, the support apparatus comprising a first support means and a second support means;

skewer means having a handle at one end and adapted for being supported between the first and the second support means; and a burner apparatus comprising a generally elongated fuel container positioned between the first and second support means and below the skewer means, and a generally elongated lid for being positioned over the fuel container, the lid having a top portion along the length of the lid with at least one elongated flame opening therethrough and a side portion having at least one vent opening therethrough.

2. The individualized barbeque apparatus of claim 1 wherein the mounting plate means is made of wood and has a continuous groove about its periphery.

3. The individualized barbeque apparatus of claim 1 further comprising a notched member fixed to the first support means above the burner apparatus, and an enclosed member having an opening therethrough fixed to the second support means above the burner apparatus, the notched member adapted for supporting the one end of the skewer means having the handle and the enclosed member adapted for receiving the other end of the skewer means therethrough.

4. The individualized barbeque apparatus of claim 1 wherein the skewer has at least one corner region along the length thereof.

5. The individualized barbeque apparatus of claim 1 wherein the skewer has a quadrilateral cross-sectional shape for defining four corner regions extending along the length of the skewer.

6. The individualized barbeque apparatus of claim 1 wherein the lid has a single elongated flame opening extending along a portion of the top and a plurality of generally circular vent openings positioned along the side portion generally parallel to the flame opening.

7. The individualized barbeque apparatus of claim 1 wherein the skewer means is rotatable in the first and second support means.

8. The individualized barbeque apparatus of claim 1 wherein the fuel container comprises an upper supporting lip on at least one side of the fuel container, the vent opening being positioned for having a vertical projection falling outside the area defined by the bottom of the fuel container.

9. A burner apparatus for burning a fuel and for being positioned below a skewer in an individualized barbeque apparatus comprising:

an elongated fuel container having a bottom area and a top edge and at least one top outwardly directed flange portion positioned around at least a part of the top edge; and an elongated lid adapted to fit over the fuel container, the lid having at least a top portion having at least one flame opening for releasing fuel vapors and a side portion having at least one vent opening positioned for having a vertical projection falling outside the region defined by the container bottom area.

* * * * *